(12) United States Patent
Peyvandi et al.

(10) Patent No.: US 8,474,553 B1
(45) Date of Patent: Jul. 2, 2013

(54) SELF-LOADING LOCOMOTION MECHANISM AND APPLICATION THEREOF

(75) Inventors: Amirpasha Peyvandi, Lansing, MI (US); Parviz Soroushian, Okemos, MI (US); Jue Lu, Okemos, MI (US)

(73) Assignee: Metna Co., Lansing, MI (US)

( * ) Notice: Subject to any disclaimer, the term of this patent is extended or adjusted under 35 U.S.C. 154(b) by 0 days.

(21) Appl. No.: 13/595,223

(22) Filed: Aug. 27, 2012

(51) Int. Cl.
*B62D 51/06* (2006.01)
*B62D 57/00* (2006.01)

(52) U.S. Cl.
CPC ...................................... *B62D 57/00* (2013.01)
USPC ......................................................... 180/8.1

(58) Field of Classification Search
CPC ....... B62D 57/00; B62D 57/024; B62D 57/032
USPC .................. 152/5; 180/8.1, 8.2, 8.3, 8.4, 8.5, 180/8.6, 8.7; 280/79; 301/5.303, 51; 305/5; 414/7
See application file for complete search history.

(56) References Cited

U.S. PATENT DOCUMENTS

| | | | |
|---|---|---|---|
| 6,793,026 B1 * | 9/2004 | De Fazio | 180/8.3 |
| 7,175,723 B2 | 2/2007 | Jones et al. | |
| 7,479,318 B2 | 1/2009 | Jagota et al. | |
| 7,554,787 B2 * | 6/2009 | Pelrine et al. | 361/234 |
| 7,632,417 B2 | 12/2009 | Suh et al. | |
| 7,762,362 B2 | 7/2010 | Kutkosky et al. | |
| 2008/0164080 A1 | 7/2008 | Asbeck et al. | |

* cited by examiner

*Primary Examiner* — J. Allen Shriver, II
*Assistant Examiner* — Felicia L Brittman (57) ABSTRACT

The present invented mechanism comprises more than two (legs) with phase difference (like polygon-shape, ellipse-shape, and etc) between their rotation angles to produce pre-loading for improved adhesion. Two rigid plates covered with adhesives are attached to each phase difference wheel. Each plate connects to the wheels via a hinge embodying a torsional spring, which forces the plate back to its original position after each contact with surface. The phase difference wheels are made of elastic materials for application of controlled pre-loads at contact surfaces during locomotion. The difference between height and width of each wheel as well as the elastic properties of the materials determine the pre-load pressure applied during locomotion. The pre-load pressure is not strongly dependent on the orientation of locomotion. This enables locomotion in vertical, inclined and even upside-down orientation and also in the non-gravity environment.

5 Claims, 12 Drawing Sheets

SELF-LOADING LOCOMOTION MECHANISM AND APPLICATION THEREOF

FEDERALLY SPONSORED RESEARCH OR DEVELOPMENT

The present invention was supported in part by the U.S. Air Force under Contract Number FA8651-07-C-0092. The U.S. Government may have certain rights in the invention.

CROSS-REFERENCE TO RELATED APPLICATIONS

Not applicable.

BACKGROUND

1. Prior Art

The following is a tabulation of some prior art that presently appears relevant:

| U.S. patents | | | |
| --- | --- | --- | --- |
| U.S. Pat. No. | Kind Code | Issue Date | Patentee |
| 2008/0164080 | A1 | July 2008 | Asbeck et al. |
| 7,632,417 | B2 | December 2009 | Suh et al. |
| 7,175,723 | B2 | February 2007 | Jones et al. |
| 7,479,318 | B2 | January 2009 | Jagota et al. |
| 7,762,362 | B2 | July 2010 | Kutcosky et al. |

2. Field of Invention

The present invention relates to a locomotion mechanism with the inherent capability to apply pressure against surfaces it contacts, without relying on the forces of gravity. In particular, the invention relates to a locomotion mechanism capable of applying pressure against surfaces of arbitrary orientation it contacts, irrespective of the gravity effect, with the purpose of improving the adhesion developed at contacting surfaces.

BACKGROUND OF THE INVENTION

There is a great interest in developing versatile locomotion capabilities for vehicles. Various mechanisms have been proposed for realizing versatile locomotion. These mechanisms employ three major adhesion principles: vacuum suction, magnetic attraction or gripping with claws/grasping. There are advantages and drawbacks associated with each of these mechanisms. For example, suction requires a smooth surface to meet the sealing requirement, and power efficiency limits the duration of untethered climbing. Magnetic adhesion can be very strong, but is limited to ferromagnetic surfaces. Micro craws are also limited to very rough surfaces such as brick and stone, but do not function on smooth surfaces such as glass or painted walls. As an example, U.S. Pat. Application No. 2008/0164080 introduces a micro craw device for climbing or clinging which would be functional only against surfaces of high roughness.

Progress in locomotion against surfaces of different types and roughness conditions has been made using an emerging generation of dry bio-inspired adhesive materials similar to those used by geckos, spiders, flies and other insects. U.S. Pat. No. 7,632,417; U.S. Pat. No. 7,175,723; and U.S. Pat. No. 7,479,318 disclose different bio-inspired adhesive materials.

To use such dry adhesives for locomotion, U.S. Pat. No. 7,762,362 presents an approach where a complex combination of cables, actuator, sensors and control systems are employed to obtain sufficient levels of friction and adhesion for climbing with low attachment and detachment forces. The focus of this approach is on achieving a relatively uniform adhesion stress to avoid premature separation by peeling. This complex approach does not emphasize pre-load application for improved adhesion. The approach which is subject of this application is simple, does not require sensors, control system, cables, and actuators, emphasizes convenient pre-load application for improved adhesion, and relies upon a rotation-based action for ease of peeling during locomotion.

In order to mobilize the adhesion capacity of dry bio-inspired adhesives and also traditional pressure-adhesive adhesives (PSAs) one needs to apply a minimum pre-load on the adhesive material. In the case of surfaces with inclined angles less than 90°, the gravity force may apply a pressure normal to the surface as pre-load to produce adhesion. This will not be the case for vertical surfaces, for surfaces with inclination angles greater than 90° where gravity produces tension on contact areas, or in the absence of gravity (e.g. in space) irrespective of the surface inclination angle. The basic objective of the new mechanism is to enable convenient application of the pre-load pressure required for adhesion of adhesive materials (e.g., dry bio-inspired adhesives) against surfaces irrespective of the orientation of locomotion (vertical, inclined, etc.) and presence of gravity. This simple mechanism can be useful for any locomotion device including wall-climbing robots which rely upon adhesion to contacting surfaces for locomotion.

SUMMARY OF THE INVENTION

The present invention entails a mechanism for improved locomotion on different surfaces irrespective of the surface inclination and the gravity effects.

in an illustrative embodiment, the locomotion mechanism uses polygonal or elliptical wheels (legs) which are installed at different orientation angles with respect to each other. The surface of polygonal or elliptical wheels (legs) is coated with peelable adhesives which require the application of a pre-load (pressure) to thoroughly contact and adhere to surfaces. The relative inclination angles as well as the stiffness of polygonal or elliptical wheels are selected so that, at each time during locomotion, the adhesion capacity of some of the wheels that have established adhesion (first group of wheels) is used to apply the pre-load pressure required for adhering the other wheels (second group of wheels) to the surface. This is a sequential approach; with continued locomotion, the adhesion capacity of the newly adhered wheels (second group of wheels) is used to apply the preload pressure required to adhere the other wheels (first group of wheel) which have separated from the surface in the course of locomotion, and are now re-establishing contact with the surface. This sequential process, through which each wheel receives the required pre-load pressure using the adhesion capacity of other wheels, operates irrespective of the surface inclination and the gravity effects. This locomotion mechanism thus enables reliable and versatile locomotion on surfaces of different inclinations on different planets (including earth) or in space. Pressure application occurs because, at each stage in locomotion, those wheels that have established adhesion tend to have a smaller distance between their axis and the surface than the wheels which require pre-load application. Hence, wheels that require (pre-load application are pushed against the surface by wheels that have established adhesion.

The wheels are fabricated using elastic (including elastomeric) materials. The constitutive behavior (including elastic modulus) of the material is chosen for application of the required preload pressure, considering the geometric characteristics of the system. At each stage during locomotion, there are wheels that have established contact and adhered to the surface, and there are other wheels which rely upon the adhesion capacity of the already adhered wheels to receive the preload pressure required for establishing contact and adhering to the surface. The wheels that have established contact have a rotational phase difference with respect to those wheels that require pre-load application. The contacting surface of wheels are rigid plates that are attached to wheel surfaces via rotational springs. These rigid plates are at least partially covered with at least one of bio-inspired fibrillar adhesives and conventional pressure sensitive adhesives. After a (first) group of rigid plates establishes contact with the surface, rotational springs maintain their orientations parallel to the surface as the adhesion force of these plates is used to apply at the required level of pre-load on the newly contacting plates of the other (second) groups of wheels. Afterwards, as locomotion continues, plates belonging to the first group peel off the surface, and the rotational springs attached to them restore their original inclinations with respect to the wheel.

BRIEF DESCRIPTION OF THE DRAWINGS

The supplementary drawings help to better understand the invented mechanism, and to explain the principles of the embodiments. Accompanying drawings are only for the purpose of illustrating the embodiments of the invented mechanism, and should not be considered as a limitation for the invented locomotion mechanism. In the drawings.

All illustrations presented here are just for depiction of the locomotion mechanism with polygonal shape (e.g., rectangular shape) wheels (legs). The embodiments presented here can be developed with other polygonal, elliptical or any other shapes which can incorporate phase difference between them.

DETAILED DESCRIPTION

Figure 1:
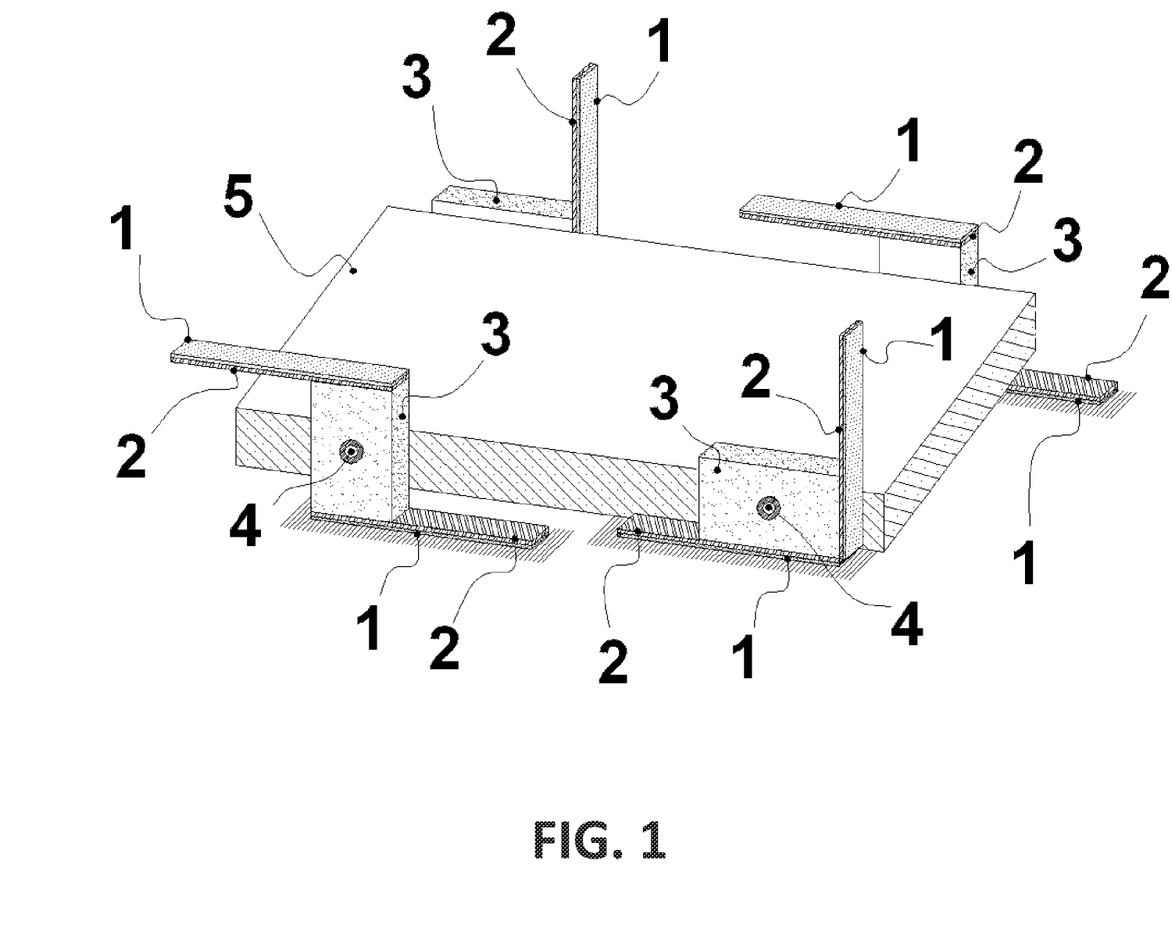
FIG. 1 shows a 3D view of the typical locomotion mechanism using wheels (legs) with phase difference.
Figure 4:
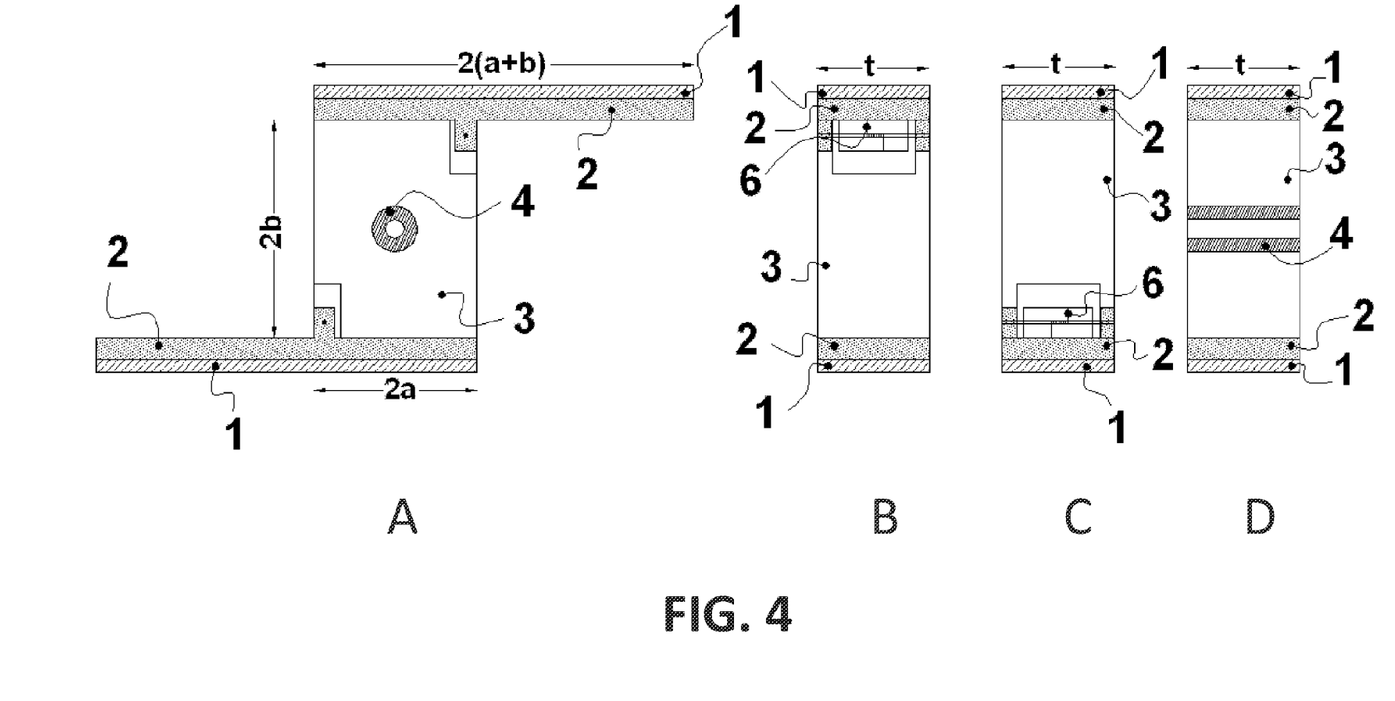
FIG. 4A-D shows the wheel (leg)'s components (A), front and back views of the wheels (legs) (B and C), and the mid section of the wheels (legs) (D).

The present invention relates to a mechanism which provides for pressure (preload) application on contact surface during locomotion. Said mechanism carries adhesives on its contact surfaces, and the pressure (preload) applied by this mechanism secures the adhesives against the surfaces they contact. The adhesives used with said locomotion mechanism may be conventional pressure sensitive adhesives or "dry" adhesives inspired by the fibrillar structures used by gecko, spider, fly and beetle for adhesion. Said mechanism uses phase differences between its wheels (legs) to apply the preload pressure. Referring to FIG. 1 and FIG. 4, the mechanism includes wheels 3 (see FIG. 1 and FIG. 4A), each of which has different components, and a rigid body (see FIG. 1 component 5). Wheels 3 are made with a low-modulus (e.g., elastomeric) material, and are thus relatively flexible. The side plates 2 (FIG. 4A) of wheels are covered with adhesives 1 (bio-inspired fibrillar adhesives or pressure-sensitive adhesives) (see FIG. 4A) which can be repeatedly applied and separated. Wheels 3 (see FIG. 1) rotate around their axis 4 (see FIG. 4D). Each two pair of diagonally oriented wheels 3 (see FIG. 1) are in phase, and the other two are 90 degrees out of phase with respect to them. The side plates 2 (see FIG. 4A) at their attachment locations (pins 4, see FIG. 4A) incorporate torsional springs 6 (see FIG. 4B and FIG. 4C) which restore their original inclinations after the plates 2 separate from the surface during rotation of wheel 3.

Each wheel has two rigid plates 2 (see FIG. 4A), each of which stays in contact with the surface over a rotation angle of 180 degrees. Solid plates increase the contact area of each wheel, and improve the uniformity of pressure applied to the contact area. Upon separation, the rotational spring 6 (see FIG. 4B and FIG. 4C) restores the original inclination of the rigid plate (see FIG. 4A). Each 180-degree rotation of the wheel 3 (FIG. 1 and FIG. 4A) uses the adhesion capacity of two in-phase wheels to apply pressure on the other two wheels (see FIG. 2, $F_1=F_2$ and $F_3=F_4$).

Figure 3:
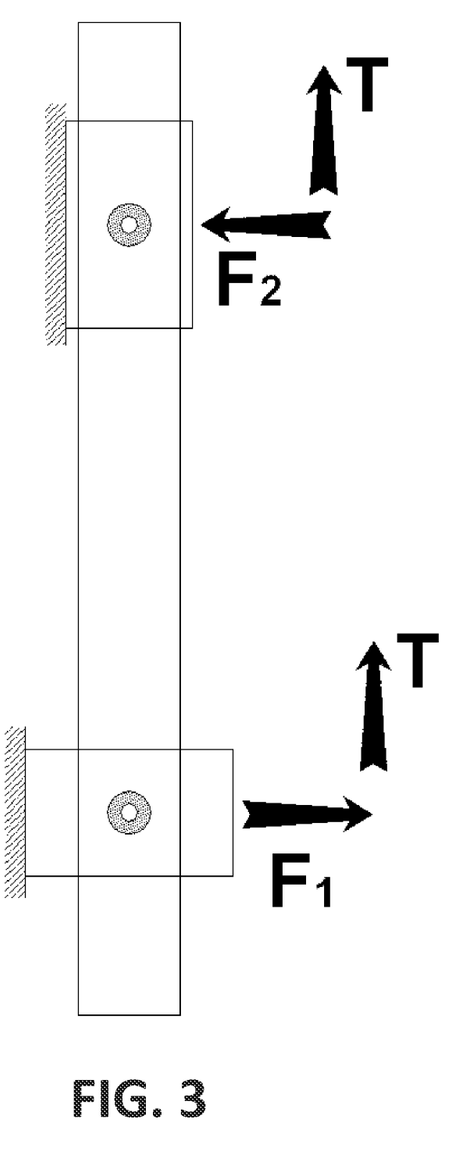
FIG. 3 shows the effect of phase difference between wheels (legs) on vertical surfaces.

FIG. 3 shows the side view of the reaction forces on the contacting surface at contact area as the locomotion mechanism moves on a vertical surface. The shear force T is caused by gravity. Support reaction F1 and F2 (FIG. 3) are the forces applied to the adhesive located on the contacting surface plate. The compressive force F2 is the preload pressure apply for establishing adhesion of a newly contacted plate, and the tensile force F1, which balances F2, is resisted by contact plates which have already established adhesion under previously applied preload pressure in the course of locomotion.

Figure 5:
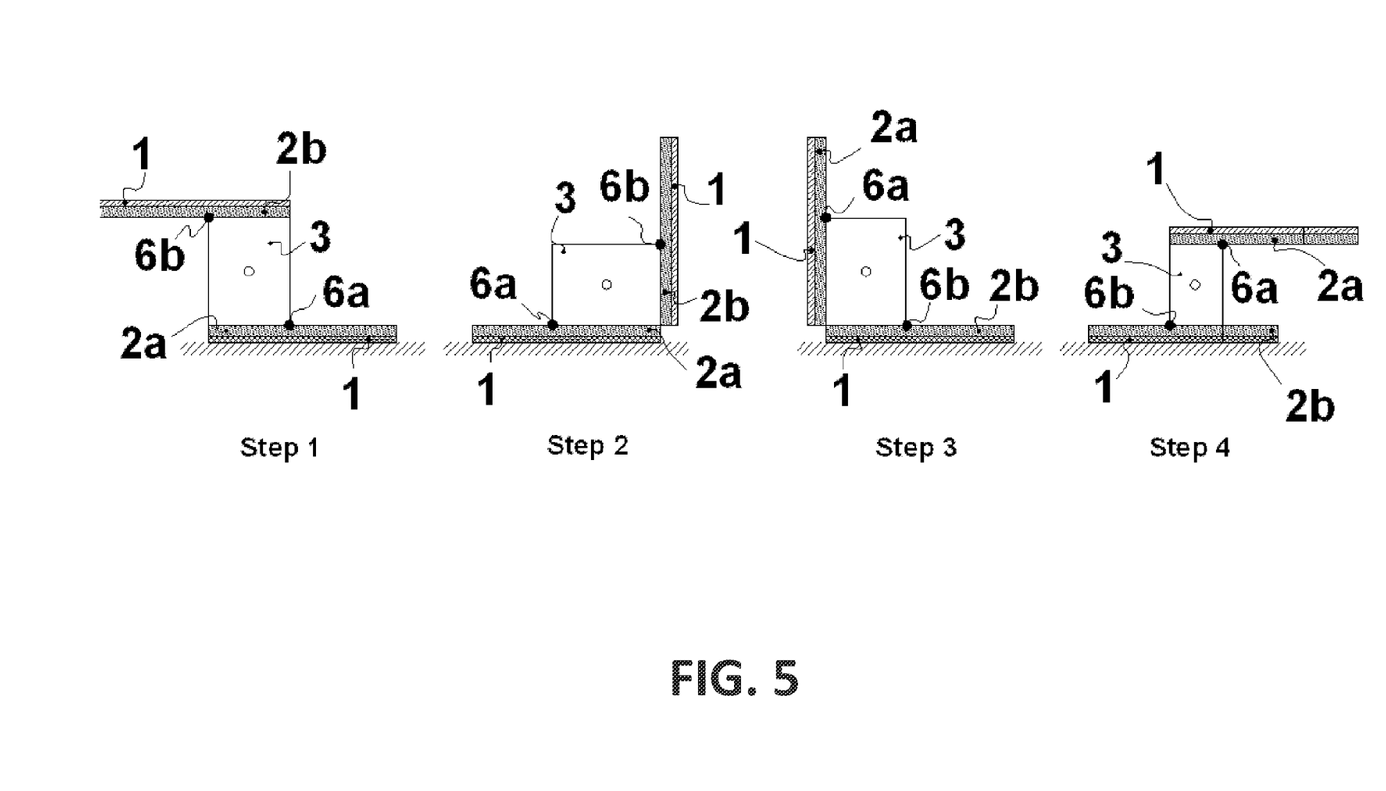
FIG. 5 shows different steps involved in the locomotion process.
Figure 8:
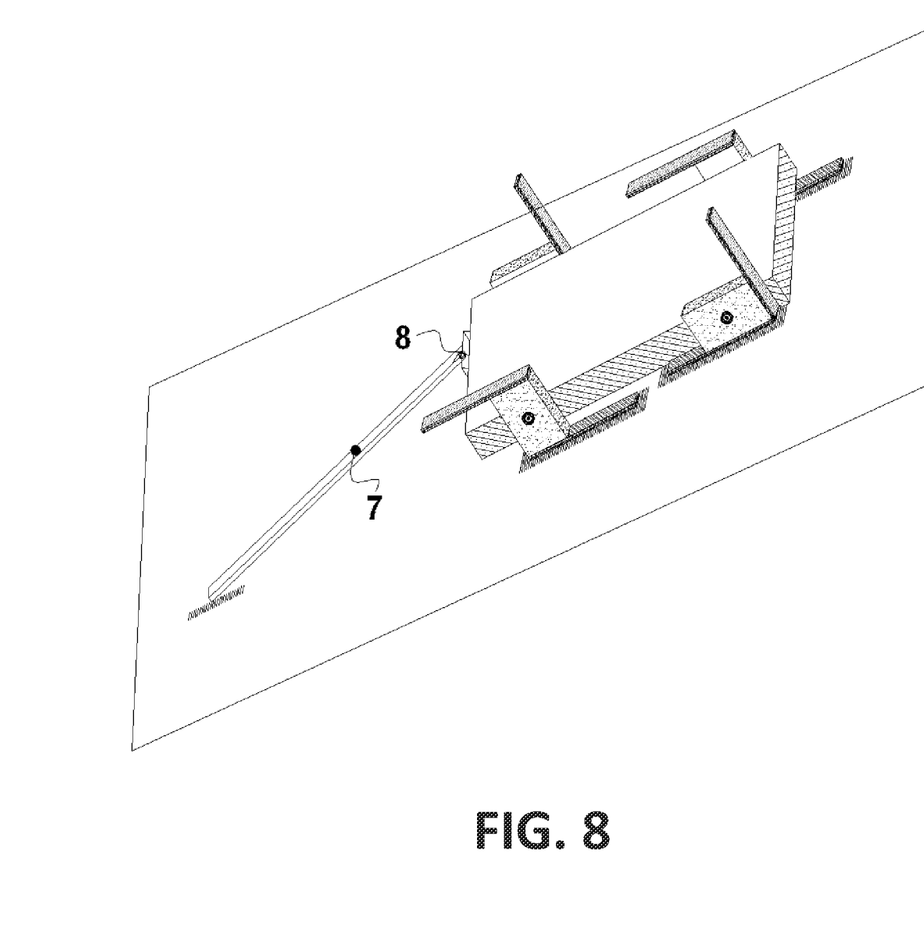
FIG. 8 shows a 3D view of a typical locomotion mechanism with tail.

FIG. 5 shows a more detailed illustration of the operation of one wheel 3 in the locomotion mechanism of FIG. 1. The hinged rigid plate 2a is attached to the wheel 3 by a hinge incorporating a torsional spring 6a; the plate rotates back and forth around this hinge during operation of the wheel. These rotational movements of the rigid plate 2a around the hinge incorporating the torsional spring 6a, which occur during rotation of the wheel 3, are key to maintaining the adhered status of the plate 2a after application of preload pressure. This rotation enables the plate 2a retain its adhered position as the wheel rotates 90 degrees. Subsequently, the plate a separates from the surface through reverse rotation, and the next hinged plate 2b establishes contact and receives the preload pressure. The four steps presented in FIG. 5 illustrate the contact mechanism of the wheel.

in step 1 (FIG. 5), plate 2a has established contact, and receives the preload pressure required for adhering to the surface. In step 2, the plate 2a has adhered to the surface, and its adhesion capacity is used to apply preload pressure to other wheels. Plate 2a remains in contact with the surface throughout steps 1 and 2, as the hinge 6a incorporating a torsional spring undergoes 90 degrees rotation. During transformation from step 2 to step 3, plate 2a separates from the surface by peeling action, and the hinge 6a incorporating torsional spring returns it to the rest position of the torsional spring in hinge 6a. In step 3, plate 2h assumes the position of plate 2a in step 1. In transition from step 3 to step 4, plate 2b and hinge 6b play the roles of plate 2a and hinge 6a in transition from step 1 to step 2. After step 4, the wheel rotation mechanism returns to step 1, and the four steps shown in FIG. 5 are repeated during locomotion. Use of a tail (FIG. 8, component 7) reduces the tensile forces applied to front wheels. The tail is pressed against the surface by the help of torsional spring (FIG. 8, component 8) located at the connection of the tail to the body of the locomotion mechanism.

Figure 6:
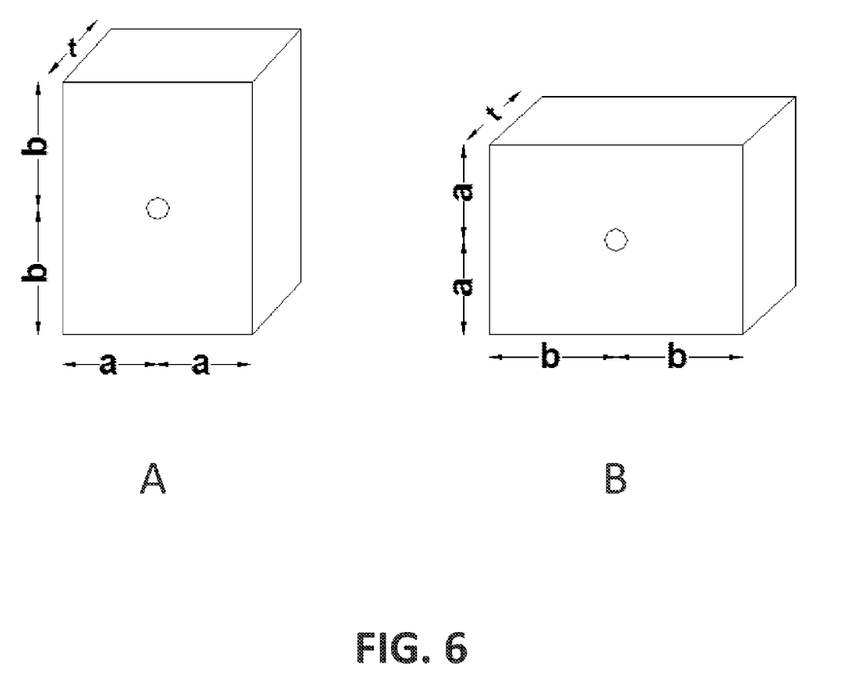
FIG. 6 shows the geometric attributes of wheel.

In the locomotion mechanism introduced in FIG. 1, each wheel is rectangular, contacting the surface on either its long side or short side. As shown in FIG. 6, the long and short sides of the rectangular wheel have lengths of 2a and 2b, respectively. These two sides are shown in FIG. 6. The wheel, in each contact configuration, can be modeled as a spring with a stiffness that depends on the wheel dimensions and configuration as well as the elastic modulus of the wheel material. This stiffness is for half of the wheel occurring between the axle and the contact surface. When the short side of the wheel is in contact with the surface (FIG. 6A), the stiffness can be calculated as follow:

$$K_1 = E \cdot a \cdot t / b \quad (1)$$

where, E is the elastic modulus of wheel material, a and b are half of the wheel width and height, respectively, and t is the wheel thickness (FIG. 6).

When the long side of the wheel is in contact with the surface (FIG. 6B), the stiffness can be calculated as follow:

$$K_2 = E \cdot b \cdot t / a \quad (2)$$

FIG. 3 shows forces applied to the four wheels in a particular step during locomotion. The tensile forces shown in FIG. 3 should balance the compression forces:

$$F_1 + F_3 = +F_4 \quad (3)$$

It should be noted that the number of wheels can vary, and the four wheels used in FIG. 3 should be considered as an example of the number of wheels.

The force developed in each wheel is equal to the wheel stiffness times the wheel deformation in the direction of applied force:

$$F_1 K_1 \delta_1, F_2 = K_2 \delta_2, F_3 = K_3 \delta_3, F_4 = K_4 \delta_4 \quad (4)$$

Figure 2:
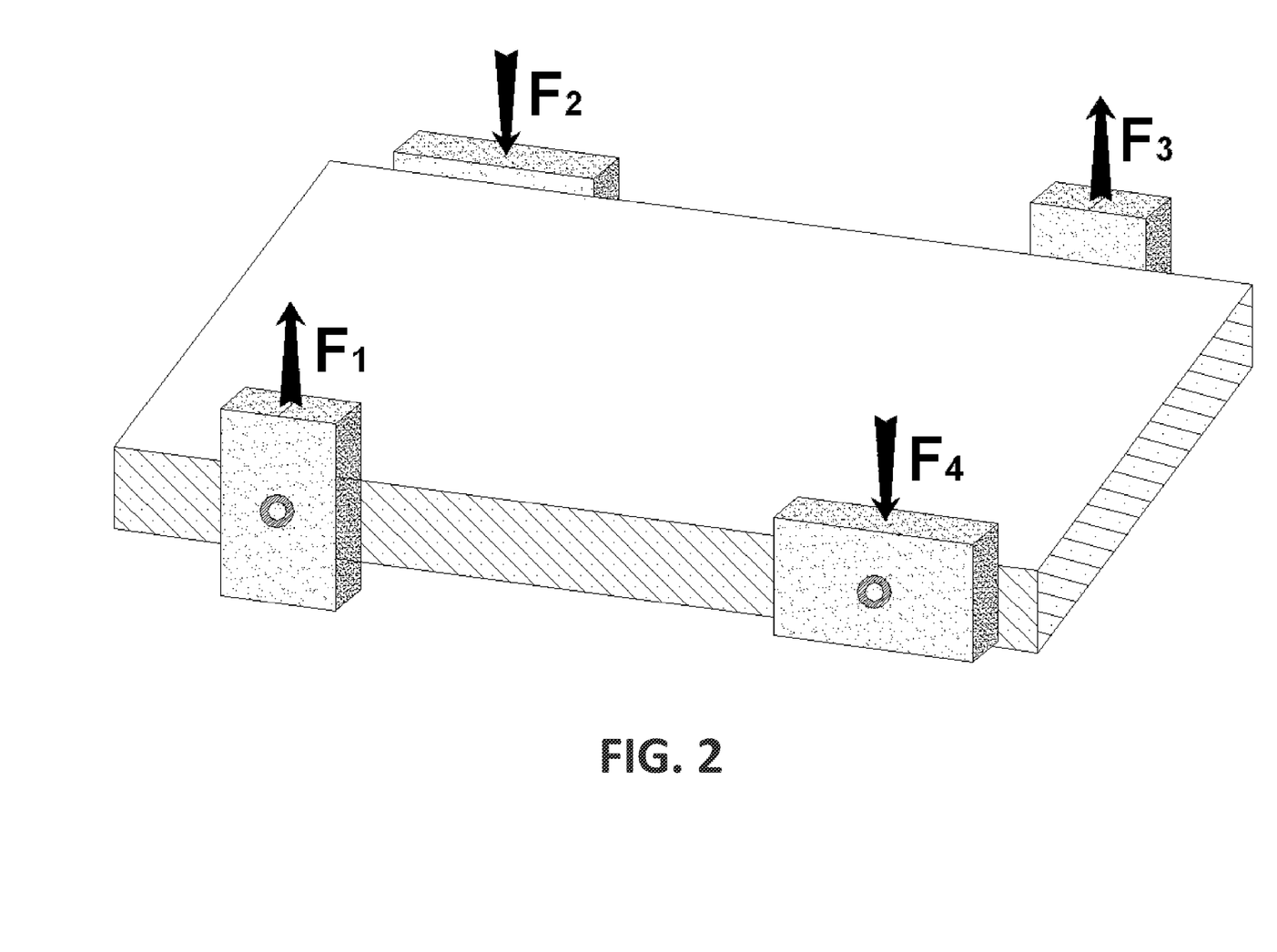
FIG. 2 is an illustration showing the produced pressure in wheels (legs) while the mechanism moves.

Where, $\delta_1$, $\delta_2$, $\delta_3$, and $\delta_4$ are the deformations in wheels 1, 2, 3 and 4, respectively. A practical design of the system shown in FIG. 2 would use similar wheels, with wheel 1 and 3 operating in the same plane, and wheels 2 and 4 also operating on the same plane; in this condition, $F_1=F_3$ (in tension), and $F_2=F_4$ (in compression). The value of all these four forces will be equal in order to satisfy the equilibrium condition of equation (3). Since wheels 1 and 3, and also wheels 2 and 4 act similarly in this practical design, this presentation focuses on wheels 1 and 2. For these two wheels, the equality of forces implies that:

$$K_1 \delta_1 = K_2 \delta_2 \Rightarrow \left(\frac{Eat}{b}\right)\delta_1 = \left(\frac{Ebt}{a}\right)\delta_2 \quad (5)$$

Hence, $$\frac{\delta_1}{\delta_2} = \frac{b^2}{a^2}$$

The Following presentation uses the notation $\beta = b^2/a^2$.

Defining $\Delta$ as the difference between the length and width of rectangular wheels ($\Delta = b - a$), one obtains:

$$\delta_1 + \delta_2 = \Delta \quad (6)$$

($\delta_1$ and $\delta_2$ are expressed as absolute values).

The above expressions enable derivation of one dimension (e.g., width, b) of polygonal wheel (rectangular wheel in this case) in terms of its other dimension (e.g., length, a) and elastic modulus for application of a targeted compressive force required for adhering the contact surface of the wheel to substrate surface, as described below.

Equations (5) and (6) indicate:

$$\delta_1 = \frac{\beta(b-a)}{(1+\beta)} \quad (7)$$

$$\delta_2 = \frac{(b-a)}{(1+\beta)} \quad (8)$$

The above equations can be used to derive (b) in terms of (a) and elastic modulus using an iterative process comprising the following steps. This design requires treatment of gravity effects. Depending on the inclination angle of the surface, the maximum tensile force in a wheel is a function of the weight of the mechanisms, location of its center of gravity, and the number of wheels (in addition to the inclination angle of the surface). For example, for a mechanism with four wheels (two of which are adhered at each moment in locomotion), which is moving in upside down position against ceiling, the force $F_t$ developed in each of the wheels 1 and 3 will be equal to the weight of the mechanism divided by 2.

An iterative approach to design of wheels in the locomotion system is introduced below. This approach assumes that the body of the locomotion system is relatively rigid when compared with the wheels.

1) Given: E (elastic modulus of wheels), $F_p$ (the compressive force per unit thickness of wheel required for adhesion), $F_t$ (tensile force developed in the already adhered wheel during application of the compressive force to the wheels establishing adhesion), $\sigma_{all}$ (adhesion capacity, force per unit area, of adhesive against the contacting surface of the wheel)

2) Assume a trial value of the wheel width (a) as well as a practical value of the wheel thickness (t)

3) $b = F_t / (t \cdot \sigma_{all})$ $$\delta_1 = \frac{\beta(b-a)}{(1+\beta)} \quad 4)$$

$$\delta_2 = \frac{(b-a)}{(1+\beta)} \quad 5)$$

6) Stop if $$\left(\frac{Eat}{b}\right)\delta_a - F_p < 0.0001;$$

otherwise, repeat from step 1 using new values of b (and t)

Figure 7:
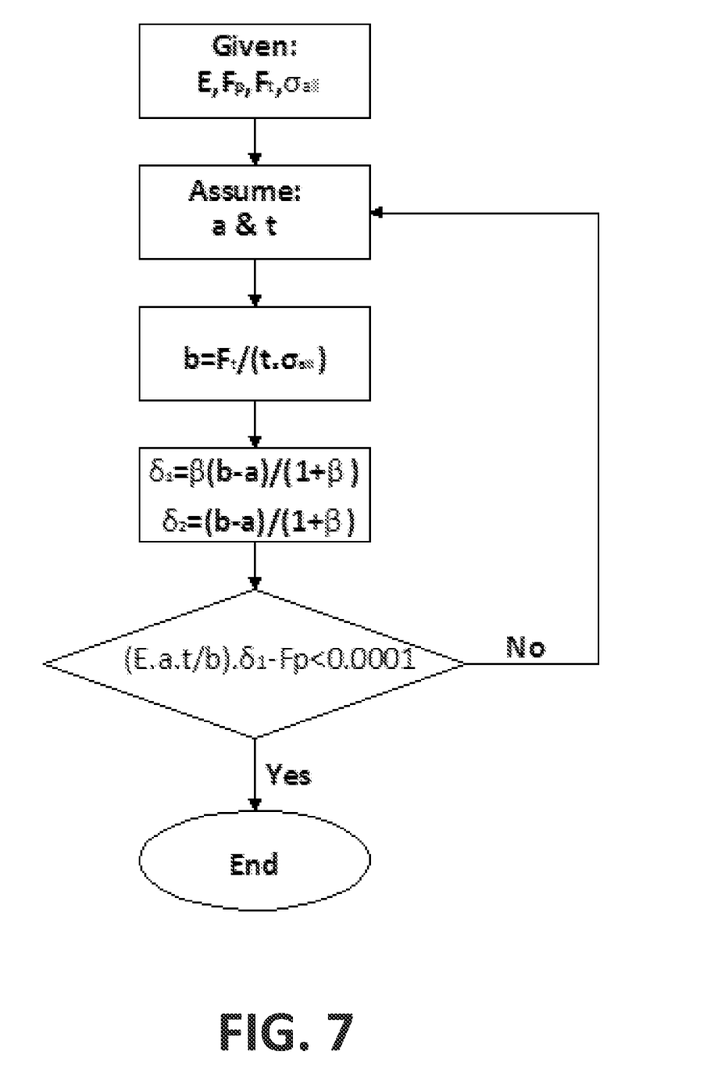
FIG. 7 is a flowchart illustrating a method to find the length and width of the stiff plate located at the bottom of wheels.

FIG. 7 shows the flowchart for the above approach to design introduced above.

Example

Figure 9:
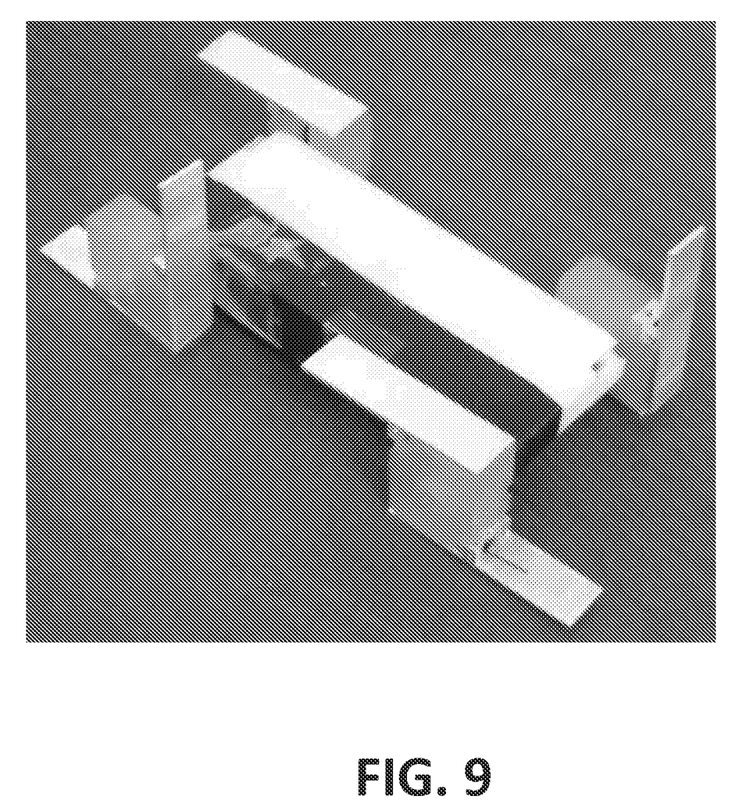
FIG. 9 shows an example locomotion unit embodying the invention.
Figure 10:
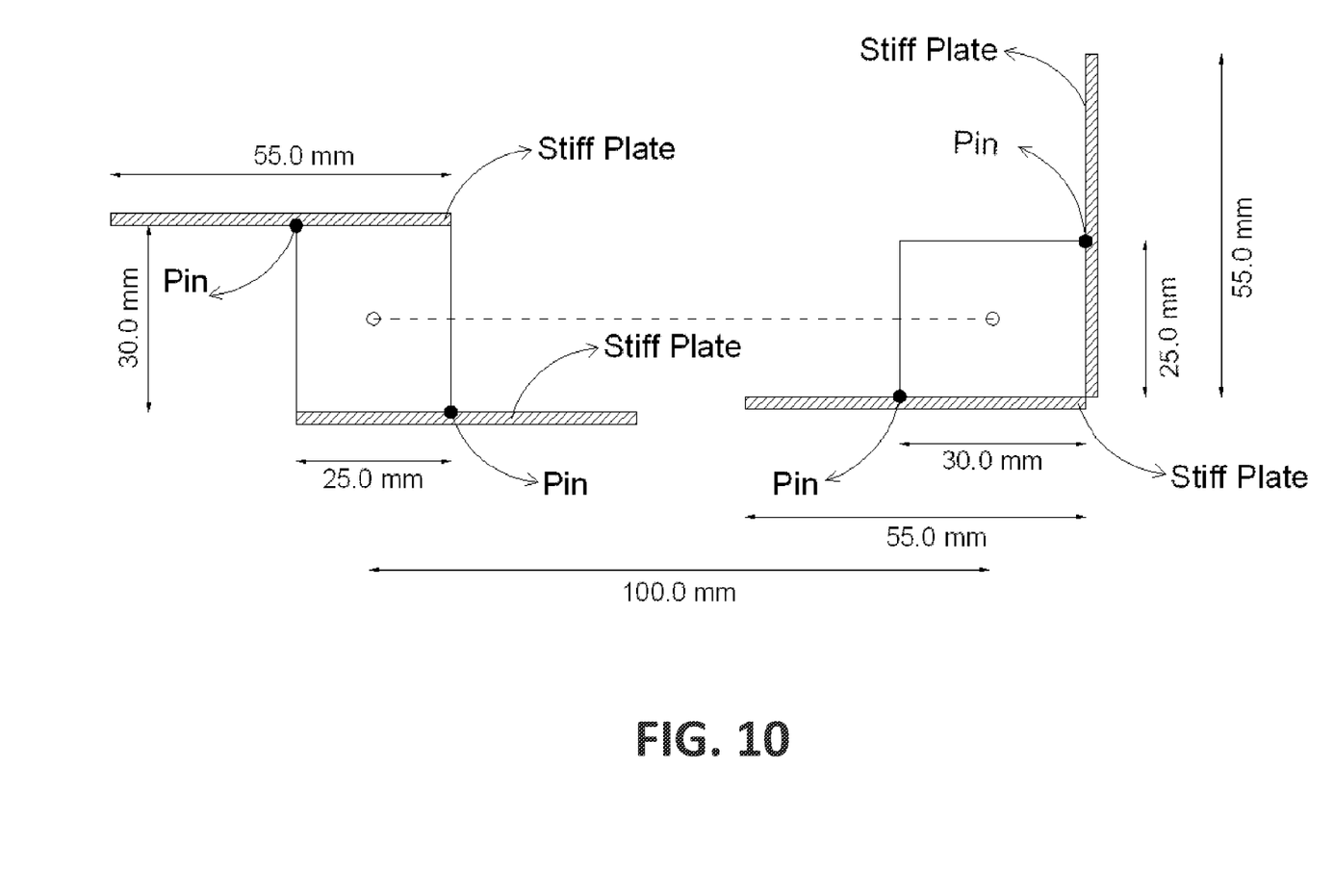
FIG. 10 shows some details of the rectangular wheel and its side plates used in the example locomotion mechanism.
Figure 11:
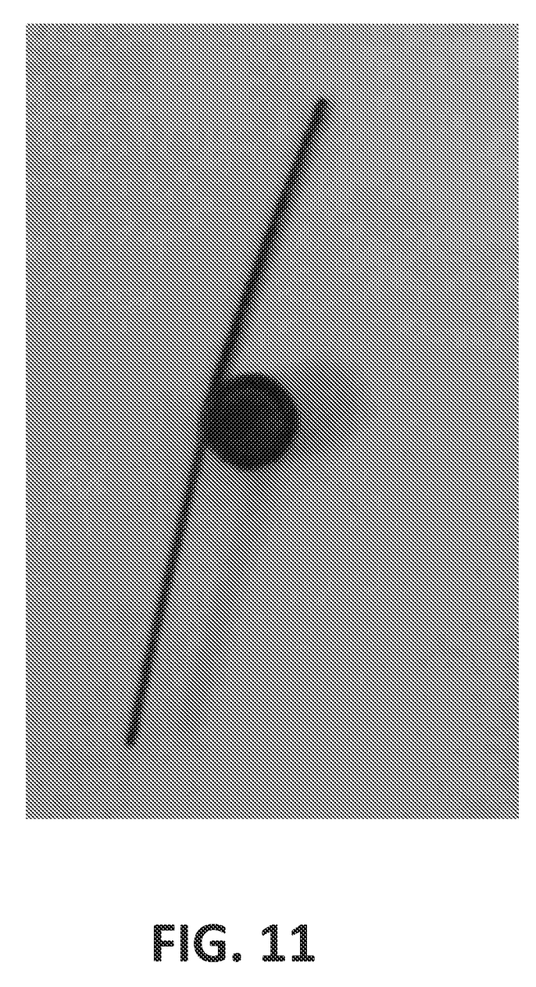
FIG. 11 shows picture of the torsional spring used in the example locomotion mechanism to connect the rigid plate to the wheel.
Figure 12:
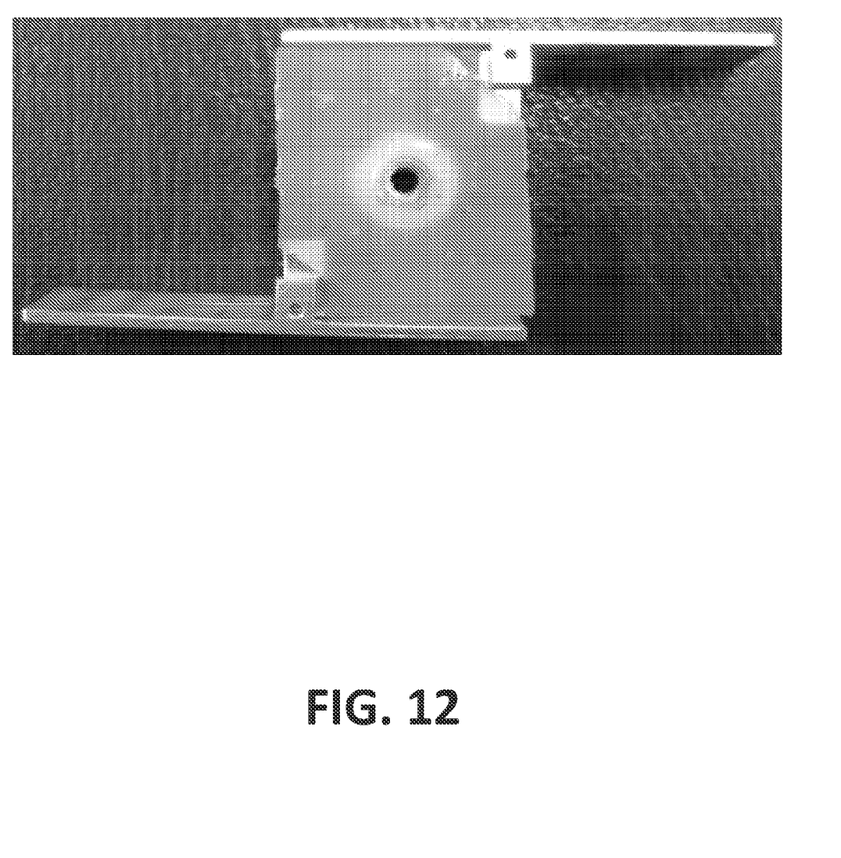
FIG. 12 shows the example rectangular wheel comprising an elastomeric rectangular body and aluminum components.

The locomotion mechanism shown is FIG. 9 is 4.5 cm wide and 12.0 cm long, and incorporates four rectangular wheels (legs); it has two axles, each of them connecting two wheels. Both axles are driven by a single motor. A rack and pinion steering mechanism pivots the front wheels (legs). The drive system and batteries are contained within the system, which weighs 139 grams including the weight of wheels (legs). FIG. 10 shows some details of a rectangular wheel that is 25 mm in width and 30 mm in height (all dimension presented in the figure are in millimeter). A Polyurethane elastomer with hardness of 42 A was chosen as the material used for production of rectangular wheels. This polyurethane has a tensile strength of 5.27 MPa, and an elastic modulus of 0.69 MPa (at 100% elongation). The side plates at their attachment locations (pins shown in FIG. 10) incorporate torsional springs (FIG. 11) which restore the original inclination of plates after the contact between the plate at the surface is lost in the course of wheel (leg) rotation (locomotion). FIG. 12 shows two side views of the rectangular wheel (leg) with side plates. The side plates and the inclusions in polyurethane wheel are made of aluminum.

The contact surfaces of the side plates of wheels were covered with bio-inspired adhesives, which are fibrillar arrays with each fibril having a diameter of 20 micrometer and a length of 20 micrometer, made of polyurethane with hardness of 15 A, elastic modulus of 1.62 MPa (at 100% elongation), and 1.62 MPa tensile strength. The two diagonally oriented wheels in the locomotion mechanism are in phase, and the other two are 90 degrees out of phase with respect to them. Each wheel has two plates, with each plate staying in contact with the surface over a wheel rotation angle of 180 degrees. Upon separation of the plate from the surface, a torsional spring restores the original inclination of the plate. During each 180-degree rotation of the four wheels, the adhesion capacity of two in-phase wheels is used to apply pressure on the other two wheels. The length and width of rectangular wheels are selected, as a function of the wheel material elastic modulus and its thickness, to apply the pressure required for adhesion of the bio-inspired adhesives.

While the invented mechanism is described in terms of preferred embodiments, they should not be construed as limiting the scope of the invented mechanism. Variations and modifications of the present invention will be obvious to those skilled in the art and are intended to be included within the scope of the following claims.

What is claimed is:

1. A locomotion mechanism comprising a minimum of three wheels divided into two subgroups of wheels, where sequential use of the adhesion capacity of one subgroup of wheels against a surface enables application of contact pressure for adhering another subgroup of wheels to the surface, with the role of different subgroups of wheels switching sequentially in the course of locomotion, and the contact pressure required for adhesion applied irrespective of the surface inclination, where:
   each wheel is rectangular or elliptical in shape, and is made of at least one of elastomeric, superelastic and elastic materials;
   wheels in each of the two subgroups are oriented perpendicular to the wheels in the other subgroup;
   wheels are centrally positioned on axles which drive them, with rotation of said axles powered by a motor;
   two plates are attached to each wheel, with a torsional spring used to attach each plate at one end to the wheel, where the two plates attached to each wheel are alternately contacting the surface during locomotion, and the contacting surface of said plates are covered with adhesive which provides for adhesion of plates to the surface followed by removal via a peeling action driven by said torsional springs, with each plate maintaining its orientation parallel to the surface during locomotion until it separates from the surface via peeling as the other plate attached to the wheel adheres to the surface;
   a rigid body carrying the axles and the wheels, which experience relatively small deformations, when compared with the deformations of said wheels, under the wheel forces transferred to the body via said axles.

2. The locomotion mechanism of claim 1, wherein a tail is attached to said body via a torsional spring in order to reduce the maximum tensile force developed at the contact surfaces of said plates.

3. The locomotion mechanism of claim 1, wherein the number of said wheels is four and the number of said axles is two, with two wheels connected to one axle, and said four wheels divided into two subgroups each of which comprises two diagonally positioned wheels that are attached to two different axles.

4. The locomotion mechanism of claim 1, wherein said adhesive is a pressure sensitive adhesive which requires application of pressure to effectively adhere to the surface.

5. The locomotion mechanism of claim 1, wherein said adhesive is a bio-inspired adhesive comprising an array of flexible fibrils, which requires application of pressure to effectively adhere to the surface.

* * * * *